3,559,511
DRILL COOLANT METHOD AND APPARATUS
John P. Schaefer, Edwardsburg, and Robert J. Green, Niles, Mich., assignors to The Wheelabrator Corporation, Mishawaka, Ind., a corporation of Delaware
Filed June 3, 1969, Ser. No. 829,975
Int. Cl. B23b *35/00, 51/06*
U.S. Cl. 77—5                                                                           18 Claims

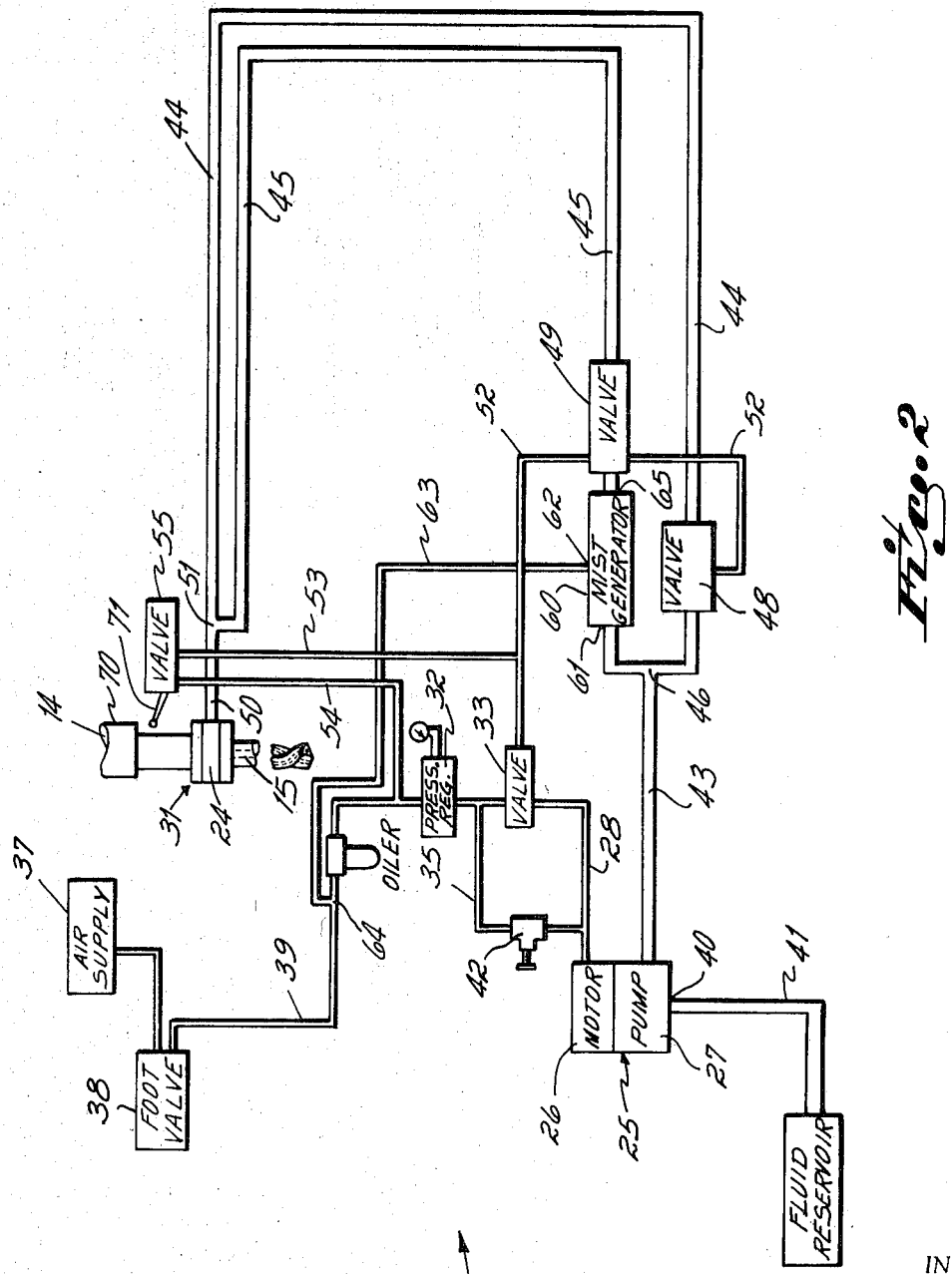

ABSTRACT OF THE DISCLOSURE

A method and apparatus for supplying coolant to an oil hole or oil tube drill or cutting tool. The method comprises the steps of supplying a liquid-air mist coolant to the drill or tool until it partially enters a workpiece and thereafter supplying liquid coolant, preferably under pulsating pressure, to the drill until it reaches full hole depth. Thereafter the liquid-air mist is supplied to the drill while it is withdrawn from the hole. The apparatus of this invention accomplishes these method steps automatically.

---

Figure 1:
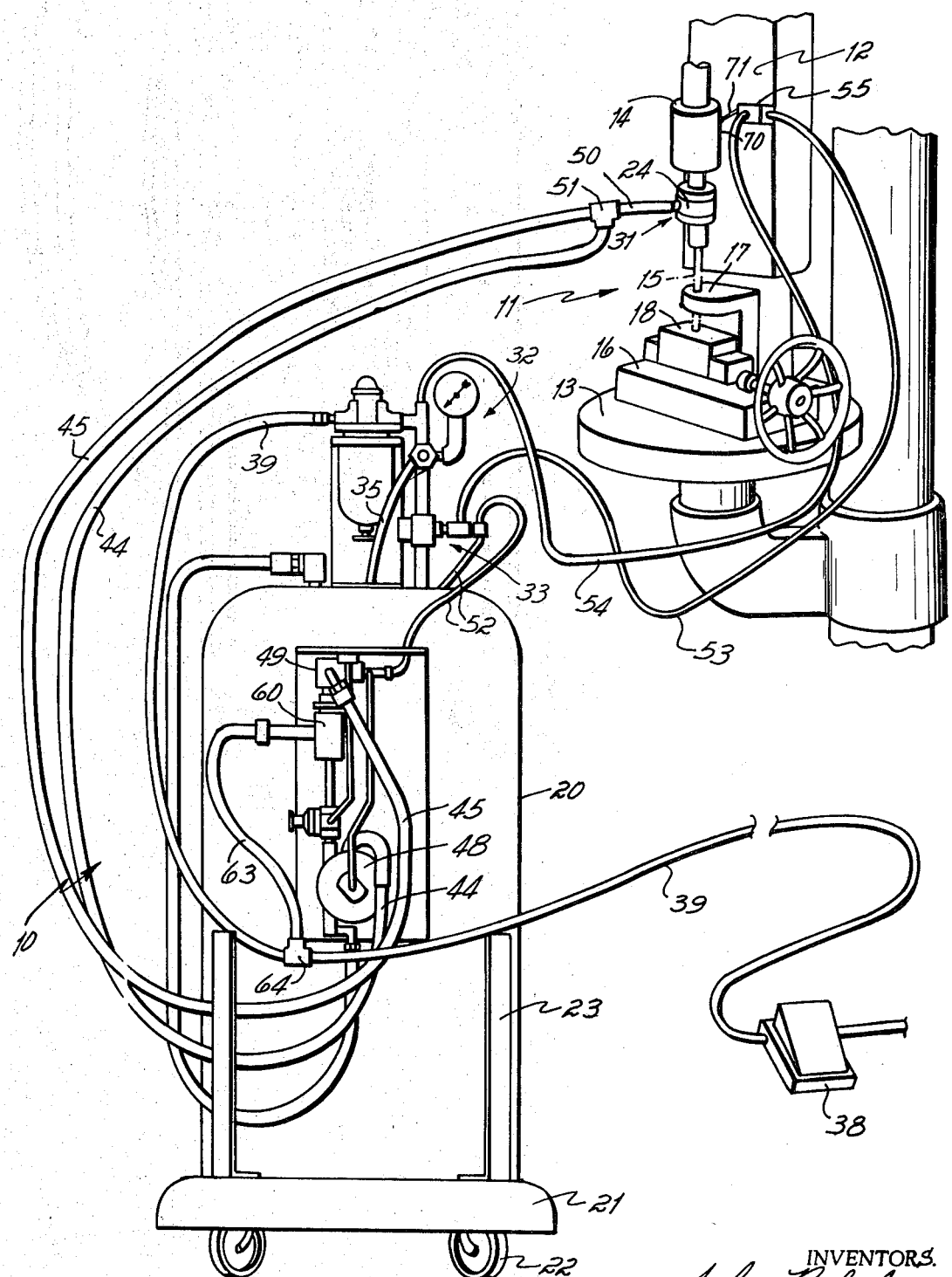

This invention relates generally to metal machining and more particularly to the drilling or cutting of metal by means of oil hole or oil tube drills or metal cutting tools. The invention is described in relation to an oil hole drill but it should be appreciated that it is equally applicable to oil hole reamers and oil hole taps, both of which machine metal from within a confined hole in a workpiece.

In U.S. Pat. No. 3,342,086, issued Sept. 19, 1967 to J. W. Borman et al. and assigned to the assignee of this application, there is disclosed a method and apparatus for supplying coolant to an oil hole drill which includes pulsating the flow of liquid coolant to the drill so that the coolant regularly impacts with the workpiece chips and flushes them from the hole. In one respect, this invention is an improvement upon the drilling method and apparatus disclosed in that issued patent.

In supplying liquid coolant to an oil hole drill, whether or not the liquid coolant is pulsed in its flow through the oil passages in the tool, the coolant exits from the drill passages at the drill tip under relatively high pressure, as for example one hundred pounds per square inch, and a relatively high flow rate as, for example, two gallons per minute. At these pressures and flow rates, it is very difficult to control splash of the coolant until the tip of the drill or cutting tool is completely buried within the hole being machined in the workpiece. Until the drill reaches that depth, the splash has heretofore been required to be physically contained by a shield or some other form of mechanical barrier to protect the machine and the machine operator as well as the area surrounding the machine from the liquid splash. The coolant is usually either a water soluble oil or a cutting oil which carries chips and debris. Either of these mediums splashed widely over a machine or an area surrounding the machine is troublesome and impairs the usage of oil hole tools. In fact, in many applications the inability to control the splash has prevented oil hole drills from being used in metal machining processes where this type of tooling would otherwise have been preferable.

It has therefore been a primary objective of this invention to provide a method and apparatus for controlling splash of coolant emitted from oil hole tools or drills.

Another objective of this invention has been to provide an improved method and apparatus for supplying coolant to an oil hole tool so that objectionable uncontrolled splash of the coolant medium is avoided.

These objectives are accomplished and one aspect of this invention is predicated upon the concept of supplying a liquid-air mist coolant to an oil hole drill until the drill enters the workpiece and the oil hole ports in the drill tip are buried within the workpiece. Only then is the liquid coolant substituted for the air-liquid mist coolant. The liquid coolant then is supplied to the oil hole ports of the drill until it reaches its full depth in the workpiece. The liquid-air mist is then preferably again supplied to the oil hole passages while the drill is withdrawn from the hole.

The practice of this method has the advantage of minimizing splash when the drill tip is outside the hole in the workpiece and the splash is most uncontrollable. At this time and until the drill tip is completly buried within the workpiece, chip clearance is not a problem since the chips do not have to travel up the flutes of the drill in order to be ejected from the workpiece hole. When the drill subsequently reaches a depth such that the tip of the drill and the exits for the oil passages are located within the hole in the workpiece, splash is no longer much of a problem but the extraction of workpiece chips through the drill flutes becomes a serious problem. Unless effectively extracted, the chips build up in the flutes and form dams precluding the flow of coolant through the flutes and generating heat as the dams of chips rotate over the workpiece. At this time, the liquid coolant is substituted for the liquid-air mist. The liquid is then a much more effective medium for transporting workpiece chips out of the hole and, if pulsated, functions to very effectively break chip dams in the drill flutes.

Another objective of this invention has been to provide an inexpensive apparatus for supplying both an air-liquid mist coolant and a liquid coolant to an oil hole drill. This objective is accomplished by utilizing a single air motor operated reciprocal liquid pump to supply liquid either directly to a drill or to a liquid-air mist generator. Preferably pneumatic valves control the flow of the liquid either alternately directly to the drill or to the liquid-air mist generator and subsequently to the drill. With this apparatus the coolant system is all pneumatically controlled and may be operated by shop air pressure without the necessity for any auxiliary electronic motors or power supplies and control circuits. Of course electronic controls may be substituted for the pneumatic controls without departing from the spirit of the invention but such a substitution does involve a safety problem and an insulating problem.

These and other objects and advantages of this invention will be more readily apparent from the following description of the drawings in which:

FIG. 1 is a perspective view of a coolant system applied to a radial drill incorporating the invention of this application, and FIG. 2 is a diagrammatic illustration of the coolant system of FIG. 1.

There is illustrated in the drawings one preferred embodiment of this invention. It comprises a coolant pumping unit 10 for supplying coolant to a conventional radial drill press 11. The drill press 11 includes a conventional vertical slideway 12 for supporting the vertically movable tool head (not shown) having a rotatable spindle 14 for supporting a drill bit 15. The drill press 11 also includes a work support 13 upon which is mounted a jig 16 having a guide bushing 17 for supporting the drill against lateral deflection as it is moved toward a workpiece 18 clamped in the jig 16. The drill press 11 and jig 16 form no part of this invention and are only illustrated to show the operative environment of the invention of this application.

The coolant pumping unit 10 is a portable unit which may easily be removed from one machine and attached to another whenever an oil hole drilling operation is programmed for a machine. It consists of a cylindrical hollow sheet metal base 20 having a lower flange 21 mounted upon a plurality of rollers or coasters 22. Hose retainer brackets 23 are welded or otherwise secured to the flange so as to extend vertically parallel but spaced from the peripheral wall of the base 20. These brackets permit the pump hoses to be wound upon the base in the fashion of a hose reel with the round bottom portion of the base 20 serving as a hose reel and the brackets 23 serving as hose retainers.

In the preferred embodiment the pump 27 (FIG. 2) and the motor 26 for driving the pump are a unitary assembly mounted inside of the hollow base 20. The pump assembly could however be mounted on top of the hollow base as illustrated in the above-identified U.S. Pat. No. 3,342,086.

In the preferred embodiment, the motor 26 is of the pneumatic type in which air under pressure is supplied to the motor via an air supply line 39 and a pressure regulator 32, and either through a pneumatic three-way control valve 33 or through a bypass line 35 and a needle valve 42. In practice, the bypass line 35 and needle valve 42 function as a restrictor to pass a limited volume of air to the pump motor when the valve 33 is in the normally closed position. This air through the bypass line 35 is operative to drive the pneumatic motor 26 at a slow rate until the valve 33 is opened. When operated at the slow rate, the motor 26 drives the pump 27 at a slow rate so as to pump a small volume of liquid coolant to the liquid-air mist generator as explained more fully hereinafter.

The pump 27 is a conventional reciprocating piston fluid pump. Both the pump 27 and pneumatic motor 26 are part of a unitary pump assembly 25 which is completely illustrated and described in U.S. Pat. No. 3,342,086. For the sake of brevity, the pump and motor have not been described in detail herein, but for purposes of completing this disclosure, reference may be made to that issued patent for a detailed description of a suitable pump and motor.

The source 37 of air under pressure for operating the motor 26 is a common line of the plant or factory where the coolant unit 10 is to be used. Most factories have such air supply lines running throughout the plant as a source of air pressure for operating pneumatic hand tools, cleaning parts or machines, etc. Since this source of power is available at little or no extra cost it is a useful and inexpensive power medium. From the source 37 air is supplied to the pneumatic valve 33 and the bypass line 35 through a foot pedal operated pneumatic valve 38 and a pneumatic conduit or air line 39. The pressure of the air at the source 37 and consequently in the air line 39 when the normally closed foot pedal 38 is open is approximately eighty pounds per square inch.

Coolant liquid is supplied to the intake port 40 of the pump 27 via a fluid intake hose 41 from a machine coolant reservoir or from any coolant storage tank. Since most drill presses and machine tools have built-in coolant reservoirs, these reservoirs are the most common source of the liquid coolant. The liquid coolant is preferably a water soluble oil but any of numerous commercial coolants may be used in the practice of this invention. The liquid coolant is supplied from the pump 27 to the drill 15 via a fluid conduit 43 and either one of a pair of conduits 44, 45 connected to the conduit 43 by a T-fitting 46. A normally closed pneumatic operated valve 48 in fluid conduit 44 and a normally opened pneumatic operated valve 49 in conduit 45 determine which of the two conduits 44, 45 connects the pump outlet conduit 43 to the drill 15 via the hose 50. The hose 50 is connected through a T-fitting 51 to both of the fluid conduits 44, 45 on the opposite side of the valves 48 and 49 from the T-fitting 46.

The two pneumatic valves 48, 49 are both connected to a common pneumatic line 52. This line is in turn connected to the pneumatic line 39 through a pair of pneumatic lines 53 and 54 and a penumatic microvalve 55. As explained more fully hereinafter, the microvalve 55 is opened and closed by the position of the drill spindle 14 and the drill 15 mounted therein.

When both the normally closed foot pedal operated valve 38 and the microvalve 55 are open, air at shop pressure of approximately eighty pounds per square inch is supplied to the pneumatic valves 48 and 49. This air pressure results in closing of the normally open valve 49 and opening of the normally closed valve 48. Alternatively, when either one of the foot pedal operated valve 38 or the microvalve 55 is closed, the pressure in the line 52 is that of the atmosphere and the valve 49 opens and the valve 48 closes.

There is a mist generator or mixing valve 60 located in the fluid line 45 between the pneumatic valve 49 and the T-fitting connection 46 to the fluid line 43. The mixing valve or mist generator is a standard commercial product which has not been described in detail herein. One such valve 60 is shown and described in U.S. Pat. No. 2,946,244, issued July 26, 1960 to H. J. Maynard. Fluid is supplied through the line 45 to a fluid intake port 61 of the mist generator 60. Air under pressure is supplied to an air intake port 62 of the mist generator 60 via a pneumatic line or hose 63 which is connected to the pneumatic line 39 by a T-fitting 64. Liquid-air mist exits from the mist generator through an exhaust port 65 which is connected through the normally open valve 49 to the coolant supply hose 50 of the drill 15.

The hose 50 supplies either the liquid-air mist coolant from the mist generator 60 or the liquid coolant from the pump 27 to the oil hole drill 15 via a rotary union or arbor 31. The rotary union or arbor 31 is a conventional coupling having a nonrotatable collar 24 within which a drill supporting rotatable shaft is mounted and through which either the liquid coolant or the mist coolant is supplied to the drill 15. The drill 15 in turn has oil hole passages extending axially downwardly to ports in the drill tip.

Operation of the system heretofore described is initiated by manual opening of the foot pedal controlled valve 38. This results in air flow to the pneumatic pump 26 at a pressure approximately eighty pounds per square inch through the pneumatic conduit 39, the bypass line 35 and needle valve 42. The needle valve 42 so restricts the flow of air that the pump 26 operates at a reduced number of cycles per minute to supply liquid coolant to the mist generator 60. This liquid coolant is pulled into the pump through the fluid intake conduit 41 and is supplied to the mist generator 60 through the pump outlet fluid conduit 43. At this time, the normally closed pneumatic valve 48 is closed in conduit 44 and the normally open pneumatic valve 49 in line 45 is opened. Simultaneously with the flow of fluid to the fluid intake port 61 of the mist generator 60 air at approximately eighty pounds per square inch is supplied to the air intake port 62 of the mist generator 60. The liquid-air mist from the generator is then transported through the fluid conduits 45 to 50 to the rotary union or rotary inducer 31 and subsequently to the oil hole passages of the drill 15. The system continues to supply coolant mist to the drill until the drill enters the workpiece. The mist coolant is discharged from the drill 15 as a cloud or suspension of fine particles of liquid coolant suspended in air.

When the drill spindle is moved downwardly so as to force the rotating drill into the workpiece, a cam surface 70 formed on the spindle 14 or the spindle support slide moves downwardly with it. When the drill has progressed into the workpiece to a depth of approximately one drill diameter the cam 70 engages the actuator 71 of the pneumatic microvalve 55 and causes the system to switch from a mist phase to a liquid phase. This change occurs as a result of the normally closed pneumatic microvalve 55 opening to connect the pneumatic line 39 to the normally closed pneumatic valve 33, the normally open pneumatic valve 49 and normally closed pneumatic valve 49 through the pneumatic conduits 54, 53. Opening of the valve 33 connects the full air pressure of line 39 (eighty pounds per square inch in the preferred embodiment)

to the pump pneumatic intake line 28 directly through the valve 33. The quantity of air passed to the pump is then no longer metered by the air bypass needle valve 42 so that the pump then operates at an increased or full speed. Closing of the normally opened mist control valve 49 disconnects the mist generator 60 from the fluid conduit 50 and the rotary arbor or rotary union 31. With the normally closed fluid flow control valve 48 in line 44 open, liquid is free to flow through the fluid conduits 43, 44 directly into the conduit 50 and to the drill 15. Preferably, the liquid flowing to the drill 15 pulses as a consequence of the reciprocating pumping action of the reciprocating pump 27. In the absence of a pressure accumulator in the fluid flow lines between the pump and the drill, the pressure regularly varies or pulsates by a pressure differential of at least thirty percent. In fact, in one preferred embodiment the pressure varies between 40 and 200 pounds per square inch at a frequency of 60 cycles per minute. The pump delivers two gallons of coolant per minute to a conventional one-half inch diameter oil hole drill. As is brought out in the above-identified U.S. Pat. No. 3,342,086, this pulsating coolant flow appreciably improves the drilling feeds and speeds and tool life over a constant pressure liquid coolant at the same or even greater flow rates or quantities. The explanation for these improved results is at least partially attributable to the superior chip removal resulting from high frequency impaction or reaction of the pulsating coolant with chips in the workpiece. This impaction breaks up chip dams which otherwise impede or retard drilling.

After the drill reaches its full depth in the workpiece 18, the cam surface 70 disengages the actuator 71 of the microvalve 55. This results in closing of the normally closed valve 55 with the result that the pressure in the pneumatic line 53 again returns to atmospheric pressure. The pneumatic valve 33 then again closes to prevent the flow of air pressure through the valve to the pump 26. Consequently, the pump 26 again returns to its slow rate of operation as a result of the throttling action of the bypass needle valve 42 in line 35 to the pump intake air line 28.

Closing of the valve 55 also results in opening of the normally open valve 49 and closing of the normally closed valve 48. The reduced volume of liquid pumped through the pump 27 then is directed to the mist generator 60. The mist generator then supplies mist through the valve 49 and fluid conduit 45 to the fluid conduit 50 and subsequently through the arbor 31 to the oil hole passages of the drill 15. The system continues to deliver liquid-air mist coolant to the drill while the drill is backed out of the workpiece because the actuator 71 of valve 55 will not operate the valve 55 when it is engaged by the cam 70 in a reverse direction. When the drill is completely extracted from the workpiece, the foot pedal actuated valve 38 may be closed to shut off the system until a new workpiece is placed in the machine.

The system heretofore described has the advantage of completely eliminating liquid splash until the drill has entered the workpiece to a depth of approximately one drill diameter. The liquid splash which then occurs is so confined by the workpiece that it must occur vertically upwardly through the drill flutes. As thus confined, the splash does not occur over a wide area and does not reach the machine operator or the area surrounding the machine.

The coolant supply system heretofore described also has the advantage of being completely pneumatically operated. The same air pressure which drives the pump through the pneumatic motor 26 also controls the pneumatic valves which determine whether the liquid or the mist is supplied to the tool. Consequently, the automatic switching between the mist and liquid coolant flow occurs without the necessity for any electrically controlled components. It will readily be appreciated through that electrically controlled valves could readily be substituted for the pneumatic valves heretofore described. Similarly, other types of coolant pumps and/or pulsating coolant supply sources could readily be substituted for the specific pump described hereinabove.

These and other changes and modifications will readily be appreciated by persons skilled in the arts to which this invention pertains. Therefore I do not intent to be limited except by the scope of the appended claims.

Having described my invention, I claim:
1. The method of drilling a hole in a workpiece which comprises:
   effecting relative rotational movement between a workpiece and a drill while said drill remains in engagement with said workpiece,
   supplying a liquid and air mist coolant to said drill tip through a passageway terminating adjacent said tip at the time said drill initially contacts and partially enters said workpiece,
   thereafter supplying liquid coolant through said passageway in said drill to said workpiece so as to cool said drill and workpiece and flush chips away from the tip of said drill, until said drill reaches the full depth of the hole, and
   thereafter again supplying a liquid and air mist coolant to said drill tip through said passageway terminating adjacent said tip while said drill is withdrawn from said hole.
2. The method of drilling a hole in a workpiece which comprises:
   effecting relative rotational movement between a workpiece and a drill while said drill remains in engagement with said workpiece,
   supplying a liquid and air mist coolant to said drill tip through a passageway terminating adjacent said tip at a low pressure at the time said drill initially contacts and partially enters said workpiece,
   thereafter supplying liquid coolant through said passageway in said drill to said workpiece at a high pressure while regularly varying the pressure of the liquid coolant flowing through said drill so as to cause it to regularly impact with the workpiece chips and to cool said drill and workpiece and flush chips away from the tip of said drill.
3. The method of claim 2 wherein the pressure variance of the liquid coolant flowing through said drill varies by at least thirty percent.
4. The method of claim 2 wherein the liquid coolant pressure varies by at least thirty percent at a frequency of at least thirty cycles per minute.
5. In a drilling apparatus which includes a drill of the type having a longitudinal passageway including an outlet opening adjacent to the tip thereof, the improvement which comprises a coolant supply unit for supplying coolant through said passageway of said drill, said coolant supply unit comprising:
   means for supplying a liquid and air mist coolant to said drill tip through said longitudinal passageway when said drill initially contacts and partially enters a hole in a workpiece,
   means for thereafter supplying liquid coolant through said longitudinal passageway in said drill to said workpiece so as to cool said drill and workpiece and flush chips away from the tip of said drill, until said drill reaches the full depth of the hole, and
   means for thereafter again supplying a liquid and air mist coolant to said drill tip through said passageway terminating adjacent said tip while said drill is withdrawn from said hole.
6. For use in combination with a drilling apparatus which includes a drill of the type having a longitudinal passageway including an outlet opening adjacent to the tip thereof, the improvement which comprises a coolant supply unit for supplying coolant through said passageway of said drill while relative rotational movement occurs between a workpiece and said drill, said coolant supply unit comprising:

means for supplying a liquid and air mist coolant to said drill tip through said passageway when said drill initially contacts and partially enters said workpiece, and means for thereafter supplying liquid coolant through said passageway in said drill to said workpiece while regularly varying the pressure of the liquid coolant flowing through said drill so as to cause the liquid coolant to regularly impact with the workpiece chips to cool said drill and workpiece and flush chips away from the tip of said drill.

7. The coolant supply unit of claim 6 wherein the means for supplying liquid coolant through said drill is operable to regularly vary the pressure of the liquid coolant flowing through said drill by at least thirty percent.

8. The coolant supply unit of claim 6 wherein the means for supplying liquid coolant through said drill is operable to regularly vary the pressure by at least thirty percent at a frequency of at least thirty cycles per minute.

9. For use in combination with a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a pump,
a first conduit for supplying liquid coolant from a reservoir to said pump,
a second conduit including a first valve for supplying liquid coolant from said pump to said drill passageway,
a third conduit connected in parallel with that portion of said second conduit which includes said first valve, said third conduit having a liquid and air mist generator and a second valve located therein, and
control means for operating said valves so that a liquid and air mist coolant is first supplied to said drill passageway through said third conduit until said drill initially contacts and partially enters said workpiece and thereafter operable to supply liquid coolant from said pump through said second conduit to said passageway in said drill.

10. The coolant supply unit of claim 9 wherein said pump is a reciprocal liquid pump.

11. The coolant supply unit of claim 10 wherein a pneumatic motor is operatively associated with said reciprocal liquid pump so as to control operation of said pump and the flow of liquid from said pump to said second and third conduits.

12. The coolant supply unit of claim 11 wherein the reciprocal liquid pump is operable to supply liquid coolant to said drill passageway at pressures which regularly vary by at least thirty percent and at a frequency of at least thirty cycles per minute.

13. For use in combination with a drilling apparatus which includes a drill of the type having a longitudinal passageway including an outlet opening adjacent to the tip thereof, the improvement which comprises a coolant supply unit for supplying coolant through said passageway of said drill, said coolant supply unit including:

a pump,
a first conduit for supplying liquid coolant from a reservoir to said pump,
a second conduit for supplying liquid coolant from said pump to said drill passageway,
a first valve for cutting off the flow of liquid through said second conduit,
a third conduit connected in parallel with said second conduit and bypassing said first valve, said third conduit having a liquid and air mist generator therein and a second valve for cutting off the flow of mist through said third conduit to said drill passage,
an air conduit for supplying air under pressure above that of the atmosphere to said mist generator, and
control means for first opening said second valve and closing said first valve so that a liquid and air mist coolant is first supplied to said drill passageway through said third conduit until said drill initially contacts and partially enters said workpiece and for thereafter opening said first valve and closing said second valve so as to supply liquid coolant from said pump through said second conduit to said passageway in said drill while said drill machines a hole in a workpiece.

14. The coolant supply unit of claim 13 wherein said control means is operable to close said first valve and open said second valve after said drill has machined the full depth of a hole in a workpiece so that a liquid and air mist is supplied to said drill passage through said third conduit as said drill is withdrawn from the hole.

15. The coolant supply unit of claim 13 wherein said pump is a reciprocal liquid pump.

16. The coolant supply unit of claim 15 wherein a pneumatic motor is operatively associated with said reciprocal liquid pump so as to control operation of said pump and the flow of liquid from said pump to said second and third conduits.

17. The coolant supply unit of claim 16 wherein the reciprocal liquid pump is operable to supply liquid coolant to said drill passageway at pressures which regularly vary by at least thirty percent and at a frequency of at least thirty cycles per minute.

18. The coolant supply unit of claim 16 wherein said first and second valves are pneumatically actuated fluid valves and wherein said control means includes a third pneumatic valve actuated by a movable element of said drilling apparatus for controlling opening and closing of said first and second valves.

References Cited
UNITED STATES PATENTS

| | | | |
|---|---|---|---|
| 3,478,843 | 11/1969 | Eckardt | 77—68X |
| 3,342,086 | 9/1967 | Borman et al. | 77—5 |
| 1,398,338 | 11/1921 | Mirrieless | 77—55 |

FRANCIS S. HUSAR, Primary Examiner

U.S. Cl. X.R.

77—55

PO-1050
(5/69)

UNITED STATES PATENT OFFICE
CERTIFICATE OF CORRECTION

Patent No. 3,559,511      Dated February 2, 1971

Inventor(s) J. P. Schaefer et al

It is certified that error appears in the above-identified patent and that said Letters Patent are hereby corrected as shown below:

Column 4, line 55, after "45" change "to" to -- and --.

Column 4, line 72, after "normally closed pneumatic valve, change "49" to -- 48 --.

Column 5, line 75, change "through" to -- though --.

Column 6, line 8, change "intent" to -- intend --.

Signed and sealed this 25th day of May 1971.

(SEAL)
Attest:

EDWARD M. FLETCHER, JR.
Attesting Officer

WILLIAM E. SCHUYLER, JR
Commissioner of Patents